No. 616,820. Patented Dec. 27, 1898.
A. BIXBY.
THILL COUPLING.
(Application filed June 30, 1898.)
(No Model.)
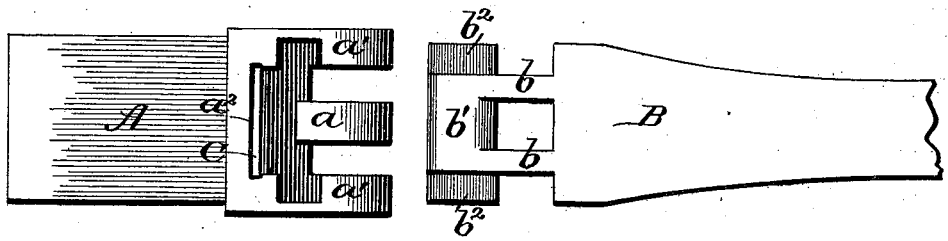
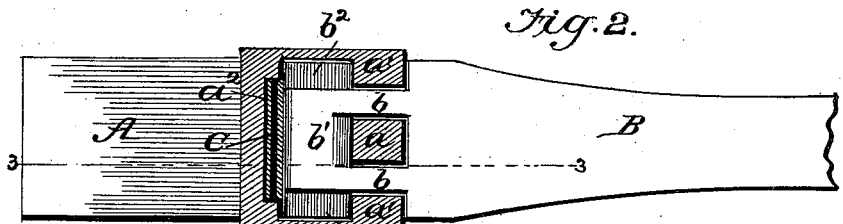
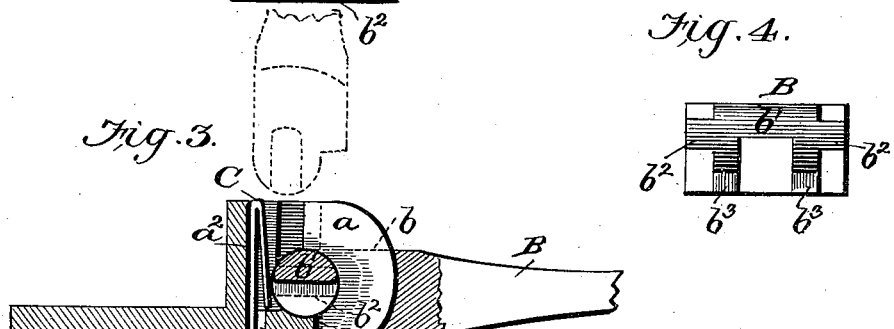
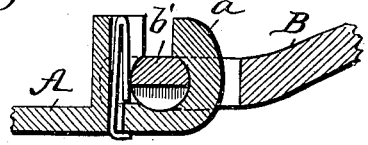
WITNESSES:
Jos. A. Ryan
Edw. W. Byrn
INVENTOR
Alfred Bixby
BY Munn & Co.
ATTORNEYS.

UNITED STATES PATENT OFFICE.

ALFRED BIXBY, OF EVANSVILLE, INDIANA.

THILL-COUPLING.

SPECIFICATION forming part of Letters Patent No. 616,820, dated December 27, 1898.

Application filed June 30, 1898. Serial No. 684,812. (No model.)

*To all whom it may concern:*

Be it known that I, ALFRED BIXBY, of Evansville, in the county of Vanderburg and State of Indiana, have invented a new and useful Improvement in Thill-Couplings, of which the following is a specification.

My invention is in the nature of an improved thill-coupling designed to afford a strong antirattling-bearing of large surface, subject to but little wear, of few parts, and capable of being easily and quickly separated without the use of a wrench or other tool; and it consists in the peculiar construction and arrangement of the parts of the same which I will now proceed to describe with reference to the drawings, in which—

Figure 1 is a plan view of the two main parts detached. Fig. 2 is a horizontal section of them coupled. Fig. 3 is a longitudinal section on line 3 3 of Fig. 2. Fig. 4 is an end view of the shaft portion. Figs. 5 and 6 are respectively a plan view and a longitudinal section of a modification, and Figs. 7 and 8 are similar views of another modification.

The thill-coupling is composed of two main parts—the part A, which is secured to the axle, and the part B, which is secured to the thills or shafts. The part A has a housing or boxing formed with a central hook-shaped portion $a$ and side bearings $a'$ $a'$, all three of which have circular bearing-seats in them with outlets at the top. In the rear wall of the casing A there is a recess $a^2$, in which is contained an inverted-V-shaped metal spring C, which at one of its lower ends is provided with a bent lip $c$, that extends through a hole $a^3$ in the bottom of the recess $a^2$ to hold the spring in place.

The part B has two shank portions $b$ $b$ and a cross-head $b'$, leaving a central hole that hooks over and embraces the central hook $a$ of the part A, and the cross-head $b'$ has outside the shanks $b$ $b$ a flattened lug $b^2$ and $b^3$, one on each side, which enter the outlets and play in the circular seats of the side bearings $a'$ $a'$. The cross-head $b'$ is also somewhat flattened on one side to permit it to enter the outlet of the center bearing-hook $a$, the outlets of the center hook $a$ and outer bearings $a'$ $a'$ being somewhat out of alinement, as shown in Fig. 1. To insert the part B into and lock it within the bearings of part A, the part B is held in a vertical position, as shown in dotted lines in Fig. 3, and the cross-head $b'$ and side lugs $b^2$ can then pass through the relatively narrow outlets of the part A in gaining access to the circular bearings within. When said cross-head and lugs reach their circular seats, the part B may be turned down into a horizontal position, which causes the cross-head and lugs $b'$ $b^2$ to be securely locked within the circular bearings, the spring C pressing against said cross-head and causing the two parts of the bearing, which have a circular oscillatory motion over each other, to be held firm and close to each other without rattling and forming a broad and strong bearing for the draft strain. On the lower side of the shanks $b$ $b$ there is formed a shoulder $b^3$, which catches against the body of the part A and acts as a stop to limit the downward movement of part B, and thus hold the shafts from resting on the ground, if desired.

In Figs. 5 and 6, which show a modification, the center hook $a$ and cross-head $b'$ are made much larger and heavier, and the side bearings, instead of being formed within a boxing at $a'$, as in Fig. 1, are formed in this instance on the outside by means of hook-shaped lugs $d$ on part B, which embrace curved ribs or flanges $d'$, formed on the outer sides of part A.

In Figs. 7 and 8 the same general construction and arrangement are used as in Figs. 5 and 6, except that the metal spring is omitted, and the top $t$ of part A is extended over the bearing parts to keep out grit and dirt and rain. In this form, if desired, a rubber spring may be seated in a recess in part A, as shown by dotted lines at $r$.

In all of these forms there is a central circular bearing formed by a hook-shaped part $a$ and a cross-head on part B with an opening behind it to receive the hook $a$, combined with side bearings on each side of the central bearing, which side bearings carry a part of the draft strain.

I am aware that it is not new to have a slot in the shaft portion lock over a hooked portion whose bearing has a narrow outlet, and I do not claim this, broadly; but I do not know that this has ever been combined with circular side bearings on each side of it which carry a part of the draft strain.

Having thus described my invention, what

I claim as new, and desire to secure by Letters Patent, is—

1. A thill-coupling composed of an axle portion having a middle hook and a circular bearing on each side of said hook and a shaft portion having a slot to receive said hook, and lugs fitting into said side bearings whereby a part of the draft strain is carried by said side bearings substantially as shown and described.

2. A thill-coupling composed of an axle portion with hook and circular bearing with narrow outlet, a side bearing on each side of the hook and a recess $a^2$ opposite said hook; and a shaft portion having a cross-head and slot to receive the said hook lugs engaging the side bearings to carry a part of the draft strain and a spring arranged in the recess opposite the cross-head, substantially as and for the purpose described.

3. A thill-coupling consisting of part A having a box or casing with hook $a$ side bearings $a'$ $a'$ and recess $a^2$, and a shaft portion having shanks $b$ $b$, cross-head $b'$, lugs $b^2$ $b^2$, and shoulder $b^3$ substantially as and for the purpose described.

ALFRED BIXBY.

Witnesses:
 HENRY M. SWEETSER,
 B. F. MITCHELL.